United States Patent [19]

Maddock

[11] 4,357,779
[45] Nov. 9, 1982

[54] HAND HELD LIQUID HERBICIDE APPLICATOR

[76] Inventor: Mitchell E. Maddock, Rte. 1, Box 24AA, Florence, Ariz. 85232

[21] Appl. No.: 240,779

[22] Filed: Mar. 5, 1981

Related U.S. Application Data

[63] Continuation-in-part of Ser. No. 72,147, Sep. 4, 1979, Pat. No. 4,305,224, and a continuation-in-part of Ser. No. 94,715, Nov. 16, 1979, Pat. No. 4,291,491.

[51] Int. Cl.³ .................. A01M 21/00; A01N 5/00
[52] U.S. Cl. ............................ 47/1.5; 401/140;
 401/203; 401/204; 401/205; 251/8
[58] Field of Search ............... 47/1.5; 401/196, 202,
 401/203-207, 140; 251/8

[56] References Cited

U.S. PATENT DOCUMENTS

| | | |
|---|---|---|
| 1,939,612 | 12/1933 | Rose ................................ 401/207 |
| 2,326,669 | 8/1943 | Nimrick ........................... 401/206 |
| 3,167,085 | 1/1965 | Redmer ............................ 251/8 X |
| 4,027,986 | 6/1977 | Patrick ............................ 401/205 X |

FOREIGN PATENT DOCUMENTS

| | | | |
|---|---|---|---|
| 1164203 | 10/1958 | France ................................ 47/1.5 |
| 530187 | 7/1955 | Italy .................................... 251/8 |
| 96304 | 5/1960 | Norway ........................... 401/205 |
| 22294 | of 1899 | United Kingdom ............. 401/205 |
| 1085635 | 10/1967 | United Kingdom ............... 47/1.5 |

*Primary Examiner*—Steven A. Bratlie
*Attorney, Agent, or Firm*—Herbert E. Haynes, Jr.

[57] ABSTRACT

A hand-held liquid herbicide applicator for wipingly applying the liquid herbicide on undesired vegetation. The applicator includes an elongated tubular handle having a supply container on its upper end with a special differential pressure operated vent valve in the container. A flow control valve is mounted in the handle for controlling the flow of the liquid herbicide through the handle to an applicator head carried on the bottom of the handle. The applicator head includes an especially configured synthetic sponge which is formed with a porous relatively dense peripheral skin so that the liquid herbicide received from the handle will evenly saturate the entire sponge to prevent uncontrollable liquid flow in one or more localized parts of the sponge.

14 Claims, 6 Drawing Figures

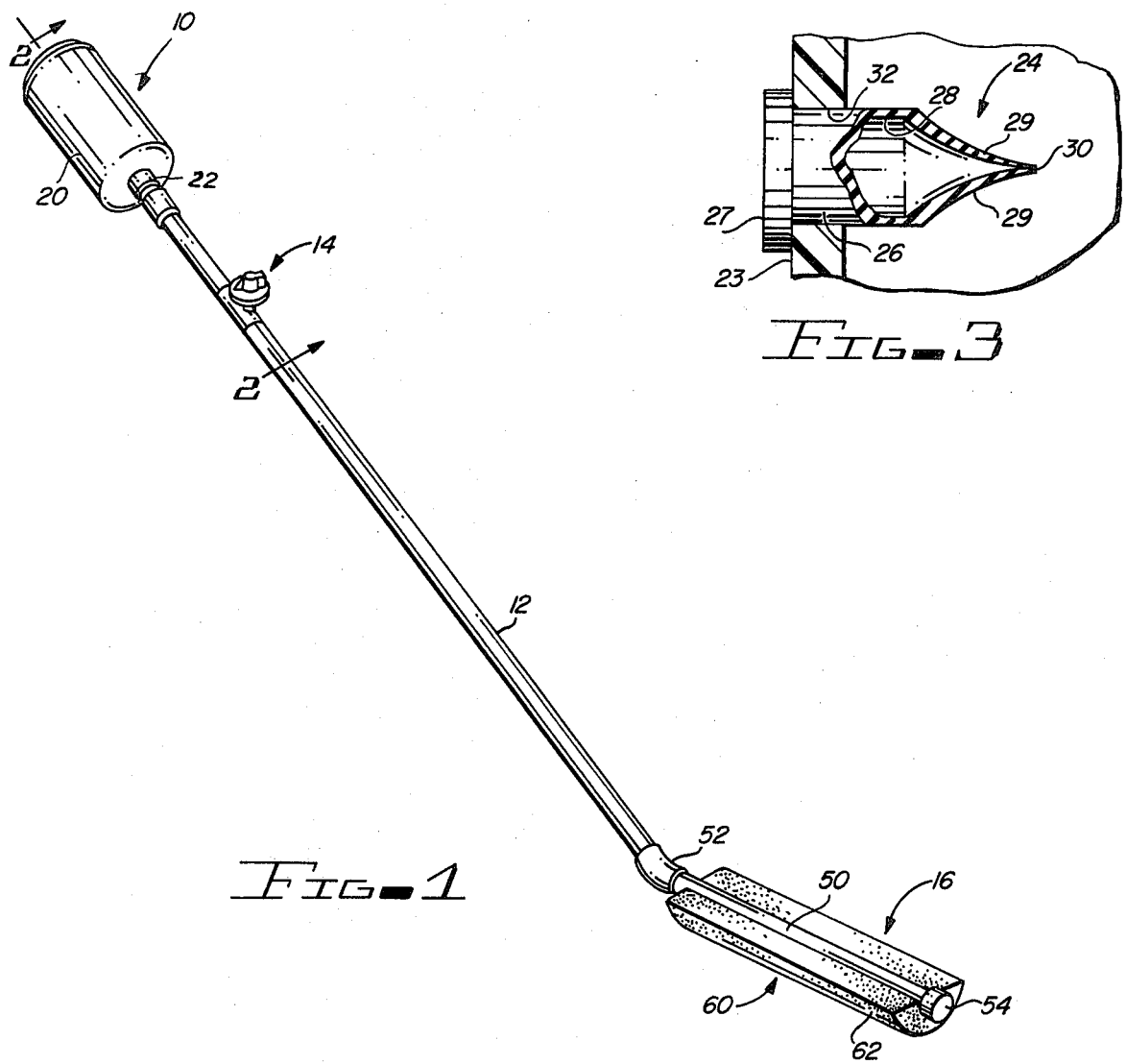
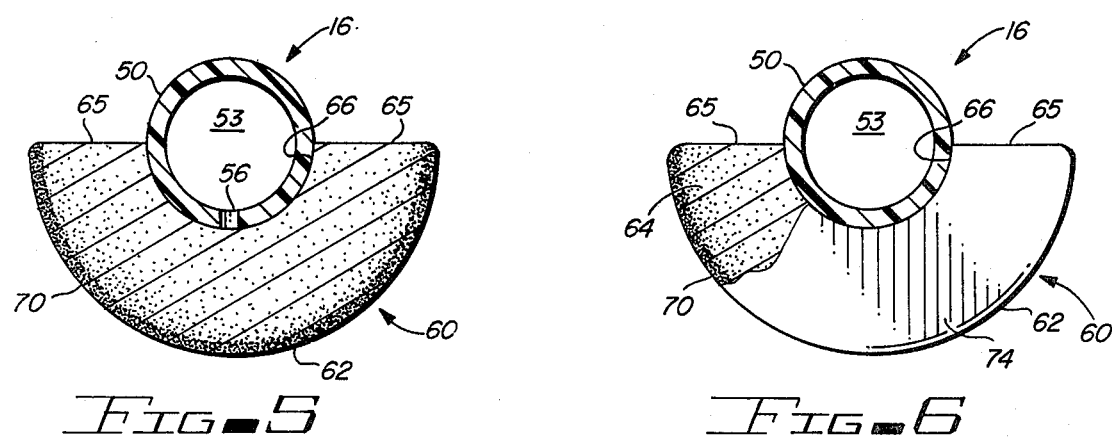

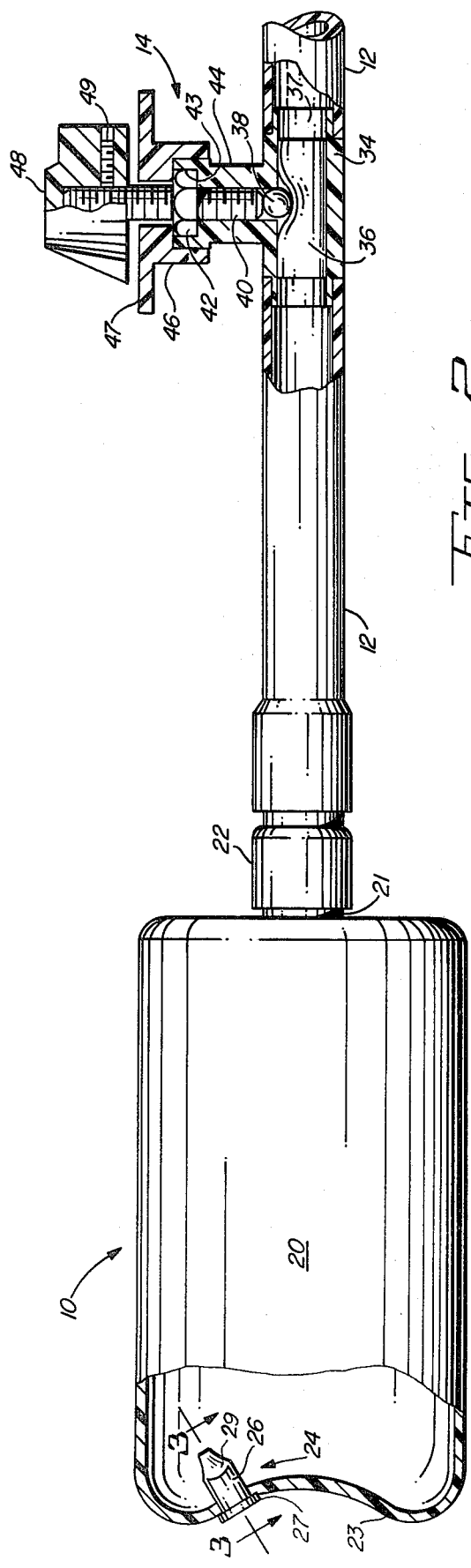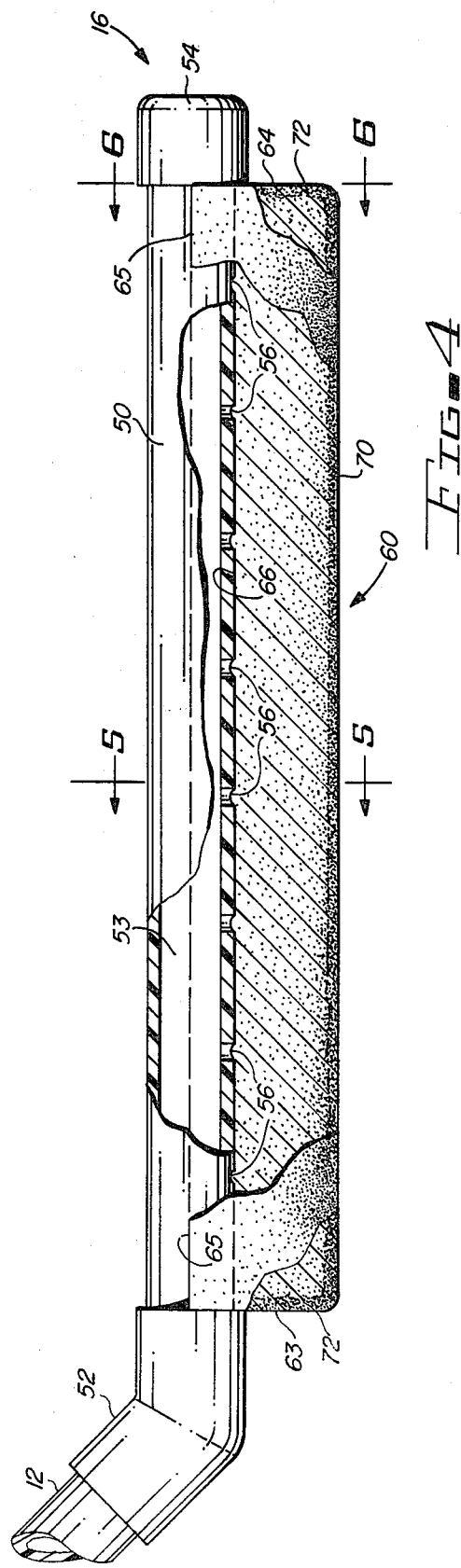

HAND HELD LIQUID HERBICIDE APPLICATOR

CROSS-REFERENCE TO RELATED APPLICATIONS

This application is a Continuation-In-Part of copending U.S. patent application Ser. No. 072,147, filed Sept. 4, 1979 for APPARATUS FOR SELECTIVE APPLICATION OF HERBICIDE, which issued on Dec. 16, 1981, as U.S. Pat. No. 4,305,224, and of copending U.S. patent application Ser. No. 094,715, filed Nov. 16, 1979 for: LIQUID APPLICATOR, which issued on Sept. 29, 1981, as U.S. Pat. No. 4,291,491 all by the same inventor.

BACKGROUND OF THE INVENTION

1. Field of the Invention

This invention relates to mechanisms for the application of herbicides and more particularly to a hand held mechanism for the selective application of liquid herbicides.

2. Description of the Prior Art

A comparatively new type of liquid herbicide has been developed which is sometimes referred to as a systemic herbicide. A systemic herbicide is one which will be absorbed by the vegetation to which it is applied and will permeate the vegetation to kill the root systems without affecting adjacent vegetation or the soil in any way. Systemic herbicide and other types of herbicides may be applied by a conventional spray method when complete destruction of all plant life in a sprayed area is desired. However, selective herbicidal tasks such as weeding operation, require that herbicides be selectively applied only to the vegetation which is to be destroyed, and this, of course, eliminates the usage of spray application techniques.

A special herbicide applicator which is designed primarily for use with systemic herbicide has been developed for use in cultivated fields and this device is in the form of a trailing wick that is attached to a tractor, or other farming mechanism. The trailing wick applicator is carried by the farm machine so as to follow the furrows between the crop plants. In this manner, the trailing wick applicator will wipe the herbicide on the weeds that are growing in the furrows only in that the trailing wick can not be allowed to come into close proximity of the crop plants. Thus, such a device is limited in its use in that it can not be employed to kill vegetation that is proximate any plants that are not to be killed, due to the fact that the trailing wick applicator can not be controlled with any degree of accuracy.

Many hand-held liquid applicators have been devised for applying various types of liquids to various items. For example, British Pat. No. 22,294, of John H. Dawson, accepted Oct. 24, 1898, disclosed an elongated tubular handle having a liquid reservoir on one end and an irregularly shaped substantially spherical sponge on its other end and disposed so as to surround liquid discharge apertures formed in that end of the tube. This device was designed for applying water to a blackboard for cleaning thereof, and is not suitable for selective application of herbicides for several reasons. First, the tubular handle of this patented device is relatively short and straight and is thus not particularly well suited for wipingly applying herbicide on low growing weeds as the user walks about an area to be treated. However, the most serious problem with this particular prior art device, and all others known to me, is leakage, or uncontrollable liquid dripping. Liquid flowing out of the delivery apertures will quickly saturate the areas of the sponge, or other wicking materials, immediately adjacent thereto and some liquid channelization occurs which results in an area or areas of excessive liquid flow usually in the form of dripping. When the prior art applicators are being employed to wipingly apply water, as is the case in the above described Dawson Patent, or other such liquids, uncontrollable liquid flow does not present any serious problems. However, this cannot be tolerated when a systemic herbicide is being used in that damage or complete loss of desirable vegetation can result.

A particular hand-held prior art herbicide applicator has been developed for selective application purposes, and that applicator is fully disclosed in U.S. Pat. No. 4,027,986. Briefly, this particular prior art applicator comprises a reservoir handle with a fill and vent control plug on its upper end and an applicator head on its other end. The applicator head is a bell-shaped enlargement which is filled with a foam rubber material and has its lower end wrapped with a carpeting material. The herbicide flows from the reservoir handle through an orifice and saturates the foam rubber and the carpeting material. Although this applicator can be used for selectively applying herbicide on vegetation, its usage is limited to a more or less dabbing type of application due to the particular head configuration. The applicator head is designed primarily for dabbingly applying the herbicide on newly cut tree trunks to kill the root systems thereof and can not practically and efficiently be used to wipingly apply herbicide to, for example, weeds which have outgrown slower growing grasses and the like, and it is awkward to use inbetween closely spaced crop plants.

Therefore, a need exists for a new and improved hand held liquid herbicide applicator which overcomes some of the short comings and drawbacks of the prior art.

SUMMARY OF THE INVENTION

In accordance with the present invention, a new and improved hand held apparatus for selective application of herbicide, and particularly a systemic type of herbicide, is disclosed. The apparatus comprises an elongated tubular handle with a special liquid supply reservoir container on one end thereof, with a herbicide flow control valve means in the handle adjacent the container. The liquid herbicide flows from the reservoir container through the valve means at a controllable flow rate and down through the tubular handle to an especially configured applicator head carried on the lower end of the handle by which the herbicide is wipingly applyable to vegetation that is to be destroyed.

The special liquid supply reservoir container has a vent valve means mounted therein which is a leakproof check valve that operates on differential pressures to allow air to enter the container to relieve the partial vacuum that is created when the liquid herbicide is dispensed by the applicator head.

The herbicide flow control valve provided adjacent the reservoir container of the applicator apparatus is a manually manipulated device by which the flow of the liquid herbicide into the tubular handle, and thus to the applicator head, may be controlled to allow adjustment of the liquid herbicide feed rate of the applicator.

The applicator head is an elongated structure which extends angularly from the lowermost end of the tubular handle so that when the handle is held by the user so that it extends downwardly and forwardly of the user, the applicator head will lie in a substantially horizontal plane. The applicator head includes an elongated tubular dispenser conduit one end of which is coupled to the lowermost end of the tubular handle so that the bore of the dispenser conduit is in communication with the bore of the tubular handle for receiving the liquid herbicide therefrom. The other, or free end of the dispenser conduit is sealingly closed, and a plurality of incrementally spaced apertures are formed in the dispenser conduit so as to extend along the bottom surface thereof. An elongated synthetic sponge of semi-circular cross section is affixed to the dispenser conduit so as to extend along the length thereof and wrap around the bottom of the dispenser conduit. In this manner, the liquid herbicide received in the dispenser conduit will emerge therefrom through the apertures and will be absorbed by the sponge. Uncontrolled liquid flow, or dripping, resulting from liquid channelization or other localized over saturation of the sponge proximate the apertures is prevented by a relatively dense porous peripheral skin formed or otherwise provided on the peripheral surfaces of the sponge the porous relatively dense peripheral skin retards surface wetting of the sponge to the extend that complete internal saturation of the sponge takes place prior to wetting of the surface skin. Once complete internal saturation of the sponge is completed, channelization and/or other localized over saturation does not occur due to the absorption qualities of the sponge, and a uniformly wetted dripless applicator head results.

In use, the hand held liquid herbicide applicator is simply swung in a back and forth motion so that the applicator head moves in a substantially horizontal plane as the user walks about the area to be treated. Such use will bring the elongated uniformally wetted sponge into contact with, for example, weeds which have outgrown slower growing grasses or other vegetation that the user desires to keep, and the liquid herbicide will be wipingly applied only on the weeds.

Accordingly, one object of the present invention is to provide a new and improved apparatus for selectively applying liquid herbicide on undesired vegetation.

Another object of the present invention is to provide a new and improved apparatus for selective application of a systemic herbicide on undesired vegetation.

Another object of the present invention is to provide a new and improved apparatus for selective herbicide application on undesired vegetation, with the apparatus including a supply container on the upper end of an elongated tubular handle for supplying the liquid herbicide through a flow control valve at a controlable flow rate to a special applicator head provided on the lower end of the tubular handle.

Another object of the present invention is to provide a new and improved hand held liquid herbicide applicator of the above described character in which the herbicide supply container is provided with a leak-proof check valve which operates on differential pressures to admit air into the container to relieve the partial vacuum created therein when the liquid herbicide is dispensed by the applicator.

Another object of the present invention is to provide a new and improved hand held liquid herbicide applicator of the above described type wherein the flow control valve is a manually manipulatable device by which the flow of herbicide from the supply container to the applicator head may be precisely controlled.

Another object of the present invention is to provide a new and improved hand held liquid herbicide applicator of the above described character wherein the applicator head extends angularly from the bottom of the tubular handle so as to lie in a substantially horizontal plane when the applicator is carried by a user as he walks about an area to be treated.

Another object of the present invention is to provide a new and improved hand held liquid herbicide applicator of the above described character wherein the applicator head includes an elongated tubular dispenser conduit having incrementally spaced apertures formed along the bottom thereof for distributing the liquid herbicide to a special sponge carried on the dispenser conduit.

Still another object of the present invention is to provide a new and improved hand held liquid herbicide applicator of the above described type wherein the special sponge is of elongated semi-circular in cross section configuration and is affixed to the tubular dispenser conduit so as to wrap around the apertured bottom of the conduit, with the sponge being formed, or otherwise provided with, a surface skin which is porous but comparatively dense to retard initial surface wetting of the sponge long enough to allow complete and even wetting of the sponges interior.

The foregoing and other objects of the present invention, as well as the invention itself, may be more fully understood from the following description when read in conjunction with the accompanying drawings.

BRIEF DESCRIPTION OF THE DRAWINGS

FIG. 1 is a perspective view illustrating the various features of the hand held herbicide applicator of the present invention.

FIG. 2 is an enlarged fragmentary sectional view taken along the line 2—2 of FIG. 1 to illustrate the various features of the herbicide supply container and the flow control valve mechanisms which form part of the applicator of the present invention.

FIG. 3 is an enlarged fragmentary sectional view taken along the line 3—3 of FIG. 2 to show the leakproof differential pressure operated check valve provided in the herbicide supply container.

FIG. 4 is a side elevational view of the applicator head which forms part of the applicator of the present invention with portions thereof being broken away to illustrate the various features thereof.

FIG. 5 is an enlarged sectional view taken along the line 5—5 of FIG. 4.

FIG. 6 is an enlarged sectional view taken along the line 6—6 of FIG. 4.

DESCRIPTION OF THE PREFERRED EMBODIMENT

Referring more particularly to the drawings, FIG. 1 illustrates the hand held liquid herbicide applicator of the present invention which, as will hereinafter be described in detail, is shown as including a liquid herbicide supply container 10 mounted on the upper end of an elongated tubular handle 12. A flow control valve means 14 is mounted in the handle for controlling the flow of liquid herbicide (not shown) from the container through the handle to an especially configured applicator head 16 provided on the lower end of the handle.

As best seen in FIG. 2, the liquid herbicide supply container 10 is in the preferred form of a conventional bottle 20 having the usual threaded neck 21 by which the bottle is demountably attachable to the upper end of the tubular handle 12 by means of a suitable cap 22 provided thereon for that purpose. The bottle 20 may be of any suitable size and is seen as including a bottom 23 in which a leak-proof check valve means 24 is mounted for admitting air into the bottle to relieve the partial vacuum which would otherwise be formed as the herbicide is dispensed during use of the applicator.

Although various types of well known check valves may be employed to accomplish the above described purpose, the particular valve shown is preferred for economic, reliability, and other reasons which will become apparent as this description progresses. As shown best in FIG. 3, the preferred check valve means 24 comprises a sleeve-like substantially cylindrical body 26 having an enlarged endless shoulder 27 formed on one end thereof. The body 26 has a bore 28 which opens onto the end upon the shoulder 27 is formed and is normally closed on its other end by an opposed pair of substantially flattened converging flap members 29 having an elongated slit 30 formed therebetween at the point where those flap members angularly intersect. The body 26 is formed of a resilient material, such as rubber, and this, along with the flap members 29 being formed so that the wall thickness thereof decreases to a point where their extending ends are very thin, provides a relatively high degree of flexibility at those thin extending ends. As mentioned above, the bore 28 is normally closed, i.e. the slit 30 between the extending ends of the converging flap members 29 is closed, and will remain in this leak-proof state as long as the pressure in the bore 28 is less than or equal to that exerted on the exterior surfaces of the converging flap members 29. When the pressure exerted on the exterior of the flap members 29 drops below atmospheric pressure, as will occur when liquid herbicide exits the bottle 20, the pressure differential will deflect the flap members thus opening the slit 30 to admit air into the bottle and thereby relieve the partial vacuum. When this occurs, the pressure differential will become equalized and the check valve 24 will return to its normally closed state.

Differential pressure operated check valves of the type described above are commercially available products commonly referred to as a duckbill valve, and may be obtained from Vernay Laboratories Inc. of Yellow Springs, Ohio, 45387, and are identified as Duckbill VA 3444.

The check valve means 24 may be installed in the bottle 20 by drilling, or otherwise forming a hole 32 in the bottom 23 of the bottle with the hole being sized to provide an interference fit with the body 26 so that its resilient sidewall will sealingly close the hole when the valve is inserted therein in the illustrated manner.

The flow control valve means 14, like the above described check valve 24, may be any of various well known devices with the particular valve shown being the preferred embodiment.

The illustrated valve 14 is fully disclosed in U.S. Pat. application Ser. No. 190,090, filed Sept. 23, 1980, by Earl E. Chandler for: FLOW REGULATING VALVE, and assigned to the inventor of the present application. Since the illustrated, and preferred, valve is fully disclosed in the above referenced U.S. patent application, it will only be briefly described herein.

The flow control valve means 14 includes a valve body 34 molded, or otherwise formed of a material which is compatable with the material of the tubular handle 12, such as Polyvinyl Chloride, so that a suitable adhesive may be employed to mount the valve body in the handle in the manner shown in FIG. 2. A relatively short piece of elastomeric tubing 36 is tightly positioned within the fluid passage 37 of the valve body, and a ball valve 38 is used to adjustably squeeze the tube 36 to control the flow of liquid herbicide therethrough. The ball valve 38 is held in bearing engagement with the sidewall of the elastomeric tube by a threaded stud 40 which is carried in a nut 42 that is captively held against rotation in the bore 43 of a transverse boss 44 integrally formed on the valve body 34. A suitable cap 46 is affixed on the extending end of the transverse boss 44 and is formed to engage the nut 42 to prevent axial displacement thereof. The cap 46 may be provided with an integral valve position indicator, plate 47, and has a central bore through which the threaded stud 40 extends. A suitable knob 48 is attached to the extending end of the threaded stud, such as by a set screw 49, so that rotation of the knob will threadingly move the stud 40 to move the ball valve 38 relative to the sidewall of the elastomeric tube 36 and thereby apply more, or less squeezing force on the tube.

The applicator head 16 includes an elongated tubular dispenser conduit 50 which is coupled to the lower end of the tubular handle 12 with a suitable angular elbow 52 so that the applicator head extends angularly from the lower end of the handle 12 for reasons which will hereinafter be described in detail. The end of the dispenser conduit 50 which is coupled to the tubular handle 12 is open so that the bore 53 of the conduit 50 is in communication with the bore of the tubular handle 12 so as to receive the liquid herbicide which flows downwardly through the handle 12 from the above described supply container 10. The extending end of the tubular dispenser conduit 50 is closed such as by a suitable cap 54 which is sealingly affixed thereon. A plurality of apertures 56 are provided in the dispenser conduit 50 so as to extend in spaced increments along the bottom surface thereof.

An especially configured synthetic sponge 60 is mounted on the tubular dispenser conduit 50 so that the liquid herbicide which emerges from the apertures 56 will be absorbed by the sponge. The sponge 60 is an elongated structure which is preferably sized to extend the full length of the tubular dispenser conduit 50 and is of semi-circular cross section to provide an elongated arcuate peripheral surface 62, opposite end surfaces 63 and 64 and a substantially planar top surface which is devided into two spaced segments 65 by a semi-circular channel 66 which is formed in the sponge so as to extend the full length thereof. The channel 66 is sized so that the lower half of the tubular dispenser conduit 50 is nestingly received therein and a suitable adheasive is employed to fixedly attach the sponge to the conduit.

As is known in the art, manufacturing of synthetic sponges is a molding process which provides the molded product with a somewhat unsightly outer skin which is of the same material as thé sponge and is thus porous, but is of considerably denser character. In normal sponge fabrication processes, this unsightly outer skin is trimmed off for aesthetic reasons and to improve the liquid absorbing characteristics which would otherwise suffer due to the dense skin which, although possessing liquid absorbing characteristics, will become saturated at a much slower rate in comparison to the internal sponge material.

The special sponge 60 used in the manufacturing of the hand-held liquid herbicide applicator of the present invention is molded in accordance with standard synthetic sponge fabrication techniques, but instead of being molded in elongated four-sided blocks as is the usual practice, it is molded in the unusual shape of an elongated solid cylindrical structure (not shown). Again, contrary to normal practices, the elongated solid cylindrical sponge structure is not trimmed and is thus completely enclosed by the above described relatively dense peripheral skin.

In preparing the solid cylindrical sponge structure for use in manufacturing of the applicator of the present invention, a circular bore is drilled or otherwise formed axially therethrough and then it is longitudinally cut in half along a diameter of the cylinder. Thus, when these operations are completed, one solid cylindrical sponge structure will form two elongated semi-circular in cross section sponges 60 each having the above described semi-circular in cross section groove 66 extending along its cut top planar surface.

At this point in the description, it will be assumed that the solid cylindrical sponge structure is molded with a length dimension which matches the length of the tubular dispenser conduit 50. In such a case, it will be seen that one of the cut halves of the cylindrical sponge structure forms the especially configured sponge 60, and is ready for affixation to the dispenser conduit 50 in the hereinbefore described manner. And, the special sponge 60 has the porous relatively dense peripheral skin as shown at 70 on its arcuate surface 62, and as shown at 72 on its end surfaces 63 and 64.

As hereinbefore mentioned, the applicator head 16 is disposed in a substantially horizontal plane when in use. Therefore, all surfaces of the special sponge 60 from which uncontrollable liquid flow, or dripping, could conceivably occur, are provided with the dense skins 70 and 72. Thus, the liquid herbicide being supplied to the sponge 60 by the tubular dispenser conduit 50, will easily enter into the sponge proximate the semi-circular in cross section groove 66 in that no skin is present in that area. The received liquid herbicide will be evenly absorbed and will saturate the entire internal sponge material before the outer skins 70 and 72 become saturated. Once complete saturation is accomplished, the liquid will flow evenly to all parts of the sponge due to its absorption properties and the peripheral surface will remain uniformally wetted.

In cases where the hereinbefore mentioned solid cylindrical sponge structure is molded with a length dimension which is greater than the length of the tubular dispenser conduit 50, it will be necessary to cut it to the desired length. Such cutting will remove the porous relatively dense peripheral skin 72 from one, or possibly both, of the end surfaces 63 and 64 of the special sponge 60, and uncontrollable liquid flow could occur at those end surfaces especially if the applicator head 16 were not held in the desired horizontal plane during initial sponge wetting. To insure against this occurring, it will be seen in FIG. 4 that the apertures 56 of the tubular dispenser conduit 50 are spaced inwardly from the opposite ends of the conduit, i.e. no apertures are provided immediately adjacent the ends of the conduit. This will in most cases prevent liquid channelization, but to insure that such channelization, or other localized oversaturation, in those areas does not result in uncontrollable liquid flow, the cut end surface, or surfaces 63 and 64 may be coated with a suitable curable sealant 74 (FIG. 6) which retards, or completely prevents, surface wetting on those end surfaces 63 and 64.

Many commercially available sealants may be used for this purpose, such as any silicone rubber, and the following specific products are mentioned as examples of other sealants which will accomplish the intended purpose. One such product is identified by the trademark SCOTCH-GRIP brand rubber adhesive 1300, manufactured by the 3 M Company of St. Paul, Minn. 55101, and another suitable product is identified by the trademark SCOTCHKOTE brand electrical coating, manufactured by the Electrical Products Division of the 3 M Company at the same address.

To use the hand-held liquid herbicide applicator of the present invention, the user, after checking to make sure that an adequate supply of liquid herbicide is contained in the container 10, opens the flow control valve 14 to permit the liquid to flow into the lower portions of the tubular handle 12, and thus into the tubular dispenser conduit 50 of the applicator head 16. The user must then wait a short time until the liquid herbicide saturates the special sponge 60. The sponge 60 will swell somewhat during the saturation process and the skins 70 and 72 will change color, i.e. become darker, when the saturation is complete. Then by holding the applicator in a normal position so that the handle 12 extends angularly downwardly and forwardly with the applicator head 16 lying in a substantially horizontal plane, the user may swing the applicator head back and forth in front of him as he walks around the area to be treated to wipingly bring the sponge 60 into contact with the vegetation that he desires to destroy. The flow control valve 14 may be adjusted to suit the particular situation. For example, if the area being treated contains relatively small and sparse weeds which have outgrown a lawn, liquid herbicide flow will be less than is needed in an area of large and/or dense weed growth.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A hand-held liquid herbicide applicator for wipingly applying the liquid herbicide on undesired vegetation growing at ground level comprising:
   (a) an elongated tubular handle for holding at a forwardly and downwardly extending angle which defines an application position;
   (b) a liquid herbicide container means demountably mounted on the upper end of said tubular handle for supplying the liquid herbicide to the bore thereof;
   (c) vent valve means in said container means for admitting air thereto when the liquid herbicide flows therefrom into the bore of said tubular handle;
   (d) flow control valve means mounted in said tubular handle for controlling the flow of the liquid herbicide through the bore thereof; and (e) an elongated applicator head fixedly mounted on the lower end of said tubular handle and extending angularly therefrom in substantially horizontally plane when said tubular handle is held in its application position, said applicator head including,
   I. an elongated tubular dispenser conduit extending angularly from said tubular handle for receiving the liquid herbicide therefrom, said tubular dispenser conduit having its extending end closed and having a plurality of dispensing apertures formed incrementally along its bottom,
   II. a synthetic sponge affixed to said tubular dispenser conduit for internally absorbingly receiving the liquid herbicide dispensed thereby, said sponge having a porous relatively dense peripheral skin for retarding initial surface wetting to insure prior even internal saturation thereof.

2. A hand-held liquid herbicide applicator as claimed in claim 1, wherein said synthetic sponge has a length dimension which substantially matches that of said elongated tubular dispenser conduit.

3. A hand-held liquid herbicide applicator as claimed in claim 1 wherein said synthetic sponge has a substantially planar elongated surface with an upwardly opening semi-circular in cross section groove extending along that surface for nestingly receiving the lower portion of said tubular dispenser conduit.

4. A hand-held liquid herbicide applicator as claimed in claim 1 wherein said synthetic sponge is of elongated semi-circular cross section which defines an elongated arcuate peripheral surface, an opposed pair of end surfaces and an elongated substantially planar surface having a longitudinally extending groove of semi-circular cross section formed therein, said synthetic sponge having the bottom surface of said tubular dispenser conduit fixedly nestingly positioned in the groove formed in the planar surface thereof.

5. A hand-held liquid herbicide applicator as claimed in claim 4 wherein the porous relatively dense peripheral skin of said synthetic sponge is formed on the elongated arcuate peripheral surface of said synthetic sponge.

6. A hand-held liquid herbicide applicator as claimed in claim 4 wherein the porous relatively dense peripheral skin of said synthetic sponge is formed on the elongated arcuate peripheral surface and on the opposite ends of said synthetic sponge.

7. A hand-held liquid herbicide applicator as claimed in claim 4 wherein the porous relatively dense peripheral skin of said synthetic sponge is formed on the elongated arcuate peripheral surface and on at least one of the end surfaces of said synthetic sponge with the other end surface having a coating of sealant material thereon.

8. A hand-held liquid herbicide applicator as claimed in claim 4 wherein the porous relatively dense peripheral skin of said synthetic sponge is formed on the elongated arcuate peripheral surface thereof with the opposite end surfaces of said synthetic sponge each having a coating of sealant material thereon.

9. A hand-held liquid herbicide applicator as claimed in claim 1 wherein said vent valve means is a normally closed differential pressure operated device.

10. A hand-held liquid herbicide applicator as claimed in claim 1 wherein said vent valve means is normally closed and will move to an open state when the pressure in said container means is below atmospheric pressure.

11. A hand-held liquid herbicide applicator as claimed in claim 10 wherein said vent valve means comprises:
(a) a tubular body of resilient material having a bore which is open to ambient at one end of said body; and
(b) said body having an opposed pair of substantially flattened flap portions on the other end thereof, said flap portions being opposed to each other and converging toward the other end of said body and having a normally closed slit formed between the extending ends of said flap portions at the intersection thereof.

12. A hand-held liquid applicator as claimed in claim 1 wherein said flow control valve means is a manually operable device for movement between fully opened and fully closed positions.

13. A hand-held liquid applicator as claimed in claim 1 wherein said flow control valve means comprises:
(a) a valve body having a liquid flow passage formed therein;
(b) an elastomeric tube tightly positioned in the liquid flow passage of said valve body; and
(c) means in said valve body for adjustably exerting a squeezing force on the sidewall of said elastomeric tube for controlling the flow of liquid through the bore thereof.

14. A hand-held liquid applicator as claimed in claim 13 wherein said means in said valve body comprises:
(a) said valve body having a transverse boss with a bore extending therethrough into intersecting relationship with the liquid flow passage of said valve body;
(b) a ball valve in the bore of said transverse boss in bearing engagement with the sidewall of said elastomeric tube;
(c) a nut captively held in the bore of said transverse boss;
(d) a threaded stud carried in said nut and in contact with said ball valve; and
(e) means attached to said threaded stud for manually threadingly moving said threaded stud to adjustably move said ball valve relative to the sidewall of said elastomeric tube.

* * * * *